United States Patent
Araki et al.

[19]

[11] Patent Number: 6,115,209
[45] Date of Patent: Sep. 5, 2000

[54] CASSETTE LOADING DEVICE

[75] Inventors: Yukihiro Araki, Fujiidera; Yoshiaki Nakamura, Hirakata; Mikiya Ueda, Kobo, all of Japan

[73] Assignee: Matsushita Electric Industrial Co., Ltd., Osaka, Japan

[21] Appl. No.: 09/180,283

[22] PCT Filed: Mar. 10, 1998

[86] PCT No.: PCT/JP98/00965

§ 371 Date: Nov. 10, 1998

§ 102(e) Date: Nov. 10, 1998

[87] PCT Pub. No.: WO98/40885

PCT Pub. Date: Sep. 17, 1998

[30] Foreign Application Priority Data

Mar. 12, 1997 [JP] Japan .................................. 9-057744

[51] Int. Cl.⁷ .................................................. G11B 15/00
[52] U.S. Cl. ............................................................ 360/96.5
[58] Field of Search ............................................. 360/96.5

[56] References Cited

FOREIGN PATENT DOCUMENTS

| | | |
|---|---|---|
| 0196623 | 3/1986 | European Pat. Off. . |
| 2506983 | 5/1982 | France . |
| 3641618 | 12/1986 | Germany . |
| 57-74802 | 11/1982 | Japan . |
| 57/74801 | 11/1982 | Japan . |
| 60-124055 | 5/1985 | Japan . |
| 2093258 | 2/1982 | United Kingdom . |

*Primary Examiner*—Allen T. Cao
*Attorney, Agent, or Firm*—McDermott, Will & Emery

[57] ABSTRACT

A cassette holder 2, with a locking hook 2a and a fish hook 2c beneath a lower face of the holder 2 and having a loaded cassette 1 therein, is pressed downward by pushing a top plate 4 and moved toward a chassis frame 6. A mis-insertion-proof panel 11 disposed on a back plate 7 by a supporting shaft is rotated on a rotation supporting shaft 14 by sliding along the lower face of the holder 2. When the cassette holder 2 reaches to a lower end position, the panel swings into a space between a rear face of the cassette 1 and the back plate 7, at the same time, the locking hook 2a is engaged with the sliding lock shaft (not shown), thereby completing a cassette loading. Contrary to the downward movement, in an upward movement of the holder 2 until its upper end position, the mis-insertion-proof panel 11 rotates on the rotation supporting shaft 14, and engaging shafts 12 provided on an edge of the panel 11 slides along the lower face of the holder 2 until the shafts 12 are engaged with the hook 2c. The hook terminal receiving the shaft 12 has a boss standing at a right angle with a locus of the shaft 12, which shapes the hook 2c into a "J" letter, the panel 11 thus prevents the cassette 1 from being inserted into the mechanism by mistake.

2 Claims, 6 Drawing Sheets

5,115,209

CASSETTE LOADING DEVICE

TECHNICAL FIELD

The present invention relates to a cassette tape loading mechanism utilized in recording and playing back apparatuses including video cassette recorders and the like.

BACKGROUND PRIOR ART

Recently, various types of cassette tape loading mechanisms have been used in video cassette recorders and the like. One example of these conventional mechanisms is described by referring to the attached drawing.

FIG. 6 is a side view depicting a structure of the conventional cassette tape loading mechanism. FIG. 6 lists the following elements: cassette tape 1, cassette holder 2, link arm 3, top plate 4, side plate 5, chassis frame 6, back plate 7, up-spring 8, sliding shaft A 9, and sliding shaft B 10.

The cassette holder 2 has a locking hook 2a beneath its lower plate, and both side faces of the holder 2 are supported by a pair of link arms 3. The cassette tape 1 (illustrated with chain double-dashed line) can be inserted into the holder 2 and held therein. The up-springs 8 are anchored between the holder 2 and the link arms 3, and forces the holder 2 upward (along an arrow direction A.) The top plate 4 couples the side faces of the holder 2 around an upper face of the cassette tape 1 inserted, and has a notch (not shown) around a cassette entrance so that users can take out the cassette tape with fingers. The holder 2 also has the similar notch for the same purpose. The side plate 5 has a guide groove 5a on its side face. The sliding shaft A 9 disposed on the link arms 3 slides along the groove 5a. A bottom face of the side plate 5 is fixed to the chassis frame 6. The back plate 7 couples both the side plates 6 in their front around the rear face of the cassette 1 inserted.

An operation of the above mechanism is detailed here. First, the cassette tape 1 is inserted into the cassette holder 2 stayed at an upper end position. Second, the cassette holder 2 together with the cassette tape 1 is pressed downward (along an arrow direction B) from the top plate 4. The locking hook 2a disposed beneath the lower face of the holder 2 is then engaged with a sliding lock shaft (not shown) so that the holder 2 is locked, whereby the cassette tape 1 is completely loaded.

When the cassette 1 is taken out, a sliding lock shaft (not shown) disposed on the chassis frame 6 slides and releases the engagement with the locking hook 2a. Then the pair of up-springs 8 force the holder 2 upward (along the arrow A direction). The sliding shaft B 10 supported by the link arms 3 hits an end of the guide groove 2b disposed on the side face of holder 2, whereby the cassette holder 2 is fixed at its upper end position, where the cassette 1 can be taken out from the holder 2.

In this conventional structure, up-lifted distance of the holder 2 is so small that the user has a difficulty to pinch the cassette tape 1. If the up-lifted distance would be increased, a clearance between the bottom face of the holder 2 and the back plate 7 misleads users to put the cassette into the mechanism through the clearance.

DISCLOSURE OF THE INVENTION

The present invention intends to address the above problem. Namely it provides a cassette loading mechanism with a foolproof device in order to prevent a user from inserting a cassette by mistake into a clearance between the bottom face of the holder and the back plate, even when the up-lifted distance is increased.

The cassette loading mechanism of the present invention comprises the following elements:

(a) a cassette holder into which a cassette tape can be inserted arbitrary, (b) side plates supporting this holder so that the holder can move up-and-down on demand, (c) a back plate coupling both of the side plates around the rear face of the cassette which has been loaded by lowering the holder.

(d) a mis-insertion-proof panel, this panel is disposed between the back plate and the holder, i.e. a first edge of the panel is rotatively supported by the back plate in substantially horizontal direction, and a second edge pushes the holder so that the panel can be forced by a spring member anytime. The panel rotates by following the up-and-down movement of the holder, and when the holder is at the upper end position, the panel always presses a lower face of the holder.

(e) a hook disposed beneath the lower face of the cassette holder, (f) engaging means, disposed at a tip of the mis-insertion-proof panel, for engaging with the hook. When the cassette holder is at the upper end position, the engaging means engages with the hook so that the mis-insertion-proof panel will not rotates even if the panel is pushed from outside.

Further, when the hook is engaged with the engaging means, move the cassette holder downward from the upper end position, thereby releasing the engagement so that the mis-insertion-proof panel can be rotatable.

Through the above structure, the mis-insertion-proof panel is forced by the spring member to block a clearance between the lower face of the holder and the back plate, whereby the cassette is prevented from being mis-inserted into the clearance. At this upper end position of the holder, there is enough space for users to take out the cassette with their fingers by pinching the cassette on its upper and lower faces. The engagement between the hook and the engaging means, which will not rotates the mis-insertion-proof panel, assures to prevent the mis-insertion. This engagement can be easily released by moving the holder downward, and then the mis-insertion-proof panel can rotates by following the up and down movement of the holder, whereby the cassette loading mechanism can become more handy.

DETAILED DESCRIPTION OF EXEMPLARY EMBODIMENTS

Figure 6:
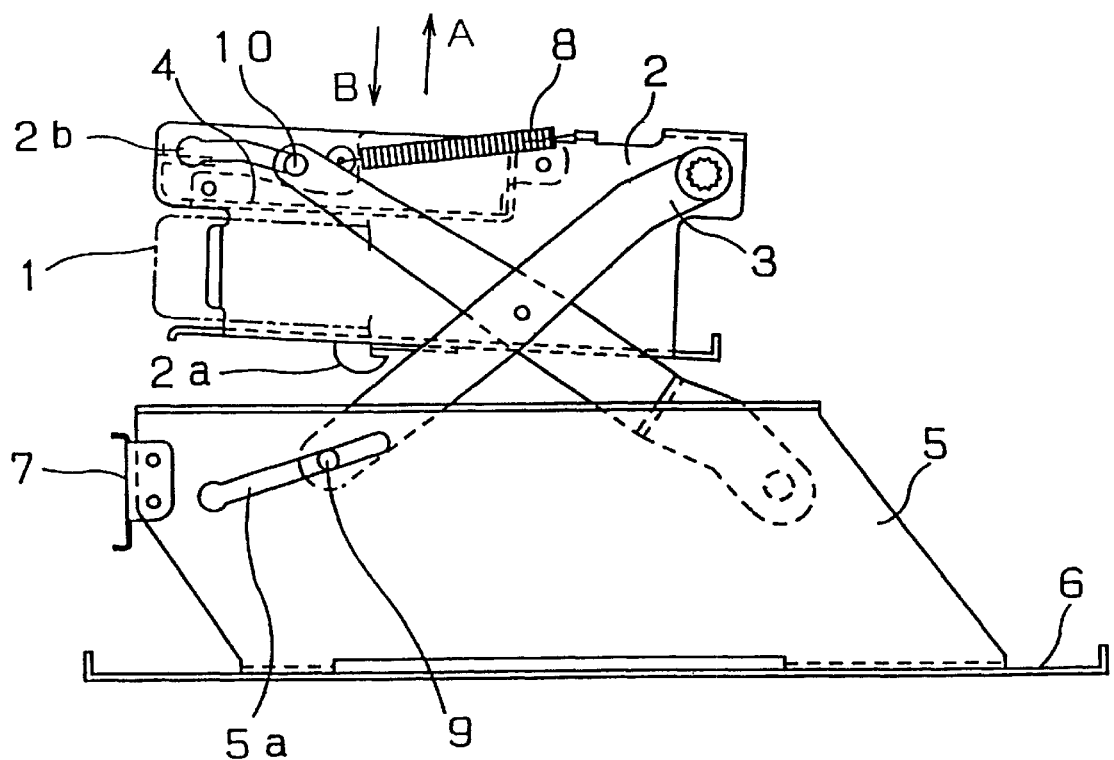
FIG. 6 is a side view depicting a structure of a conventional cassette loading mechanism.

One exemplary embodiment of the cassette loading mechanism according to the present invention is described here by referring to the attached drawings. The elements that have substantially the same functions as those used in FIG. 6 depicting a prior art are denoted with the same codes.

Figure 1:
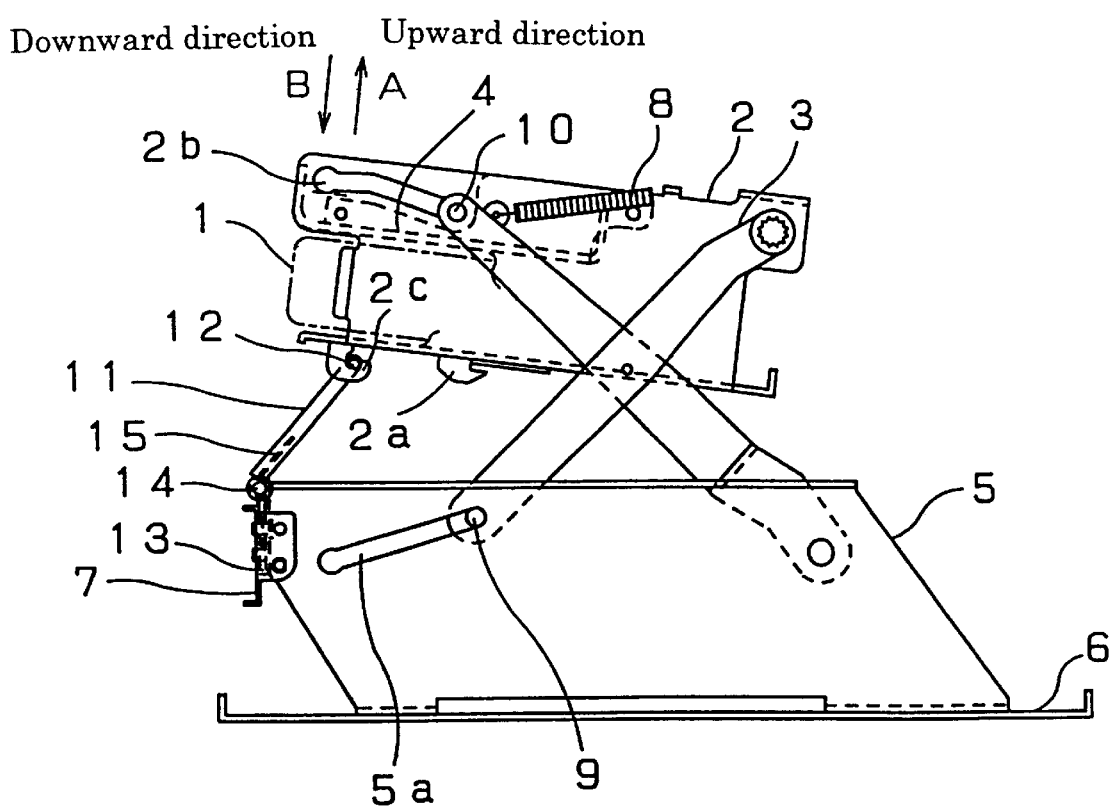
FIG. 1 is a side view depicting a structure of the cassette loading mechanism used in an embodiment of the present invention when the cassette holder thereof is at the upper end position.

FIG. 1 lists the following elements: a cassette 1, cassette holder 2, link arm 3, top plate 4, side plate 5, chassis frame 6, back plate 7, up-spring 8, sliding shaft A 9, sliding shaft B 10, mis-insertion-proof panel 11, engaging shaft 12, bearing panel 13, rotation support shaft 14, and restoring spring 15.

Figure 2:
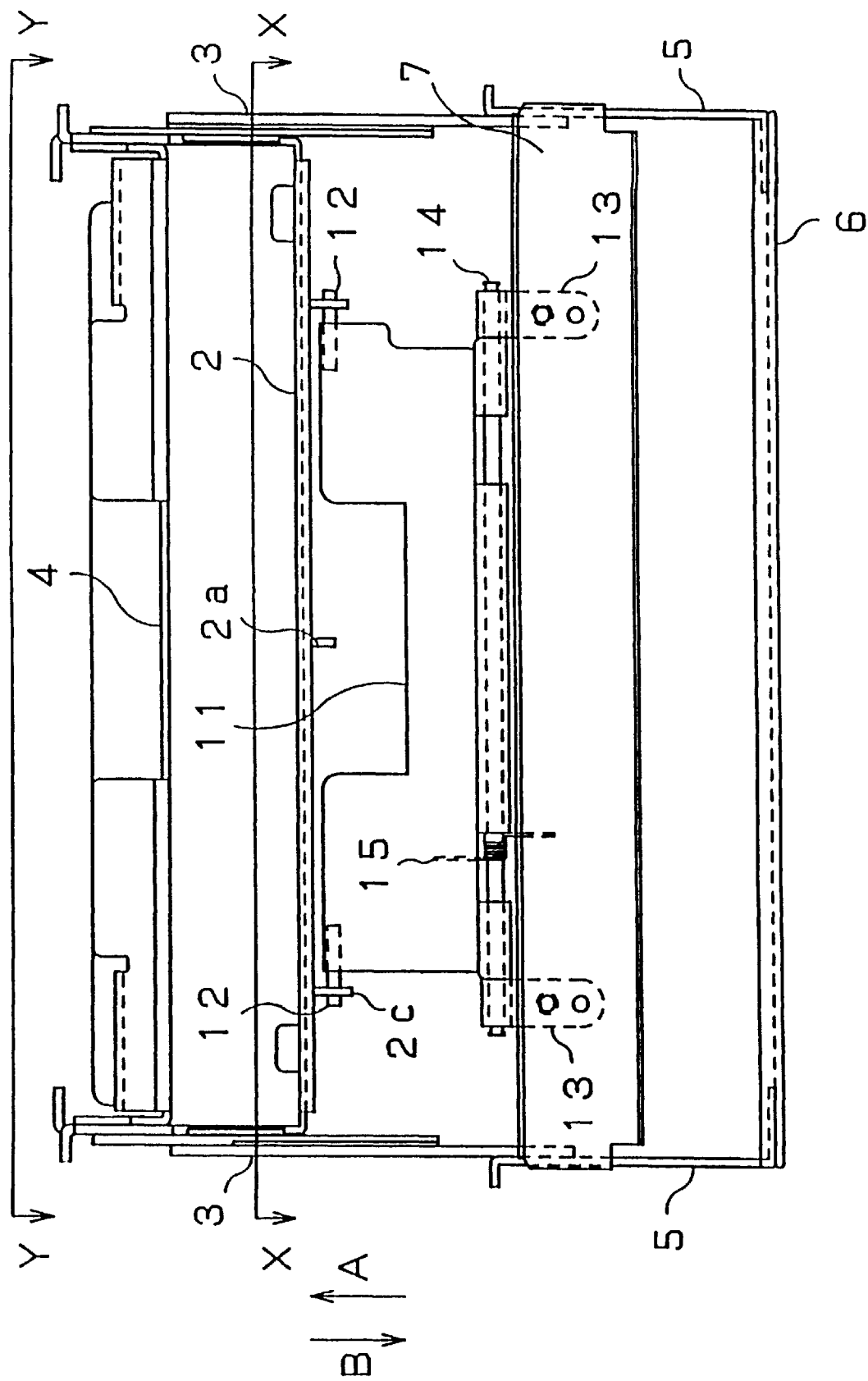
FIG. 2 is a front view depicting the structure of the cassette loading mechanism used in the embodiment of the present invention when the cassette holder thereof is at the upper end position.
Figure 3A:
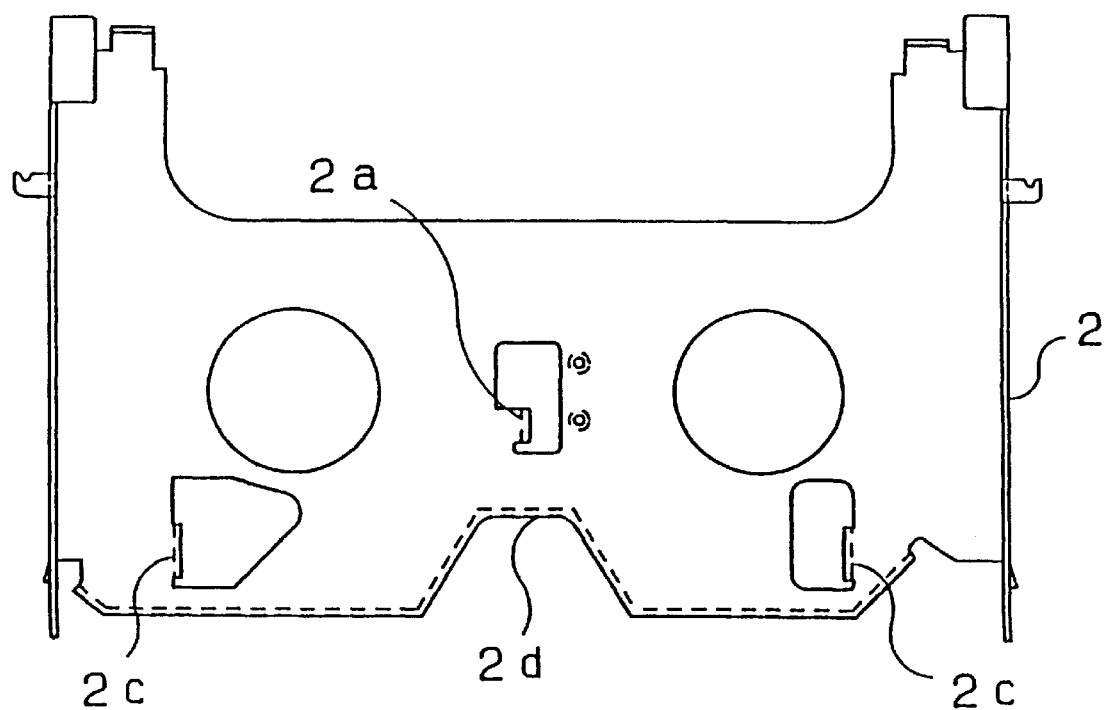
FIG. 3(a) is a plan viewed from XX line of FIG. 2 and depicting the cassette holder.
Figure 3B:
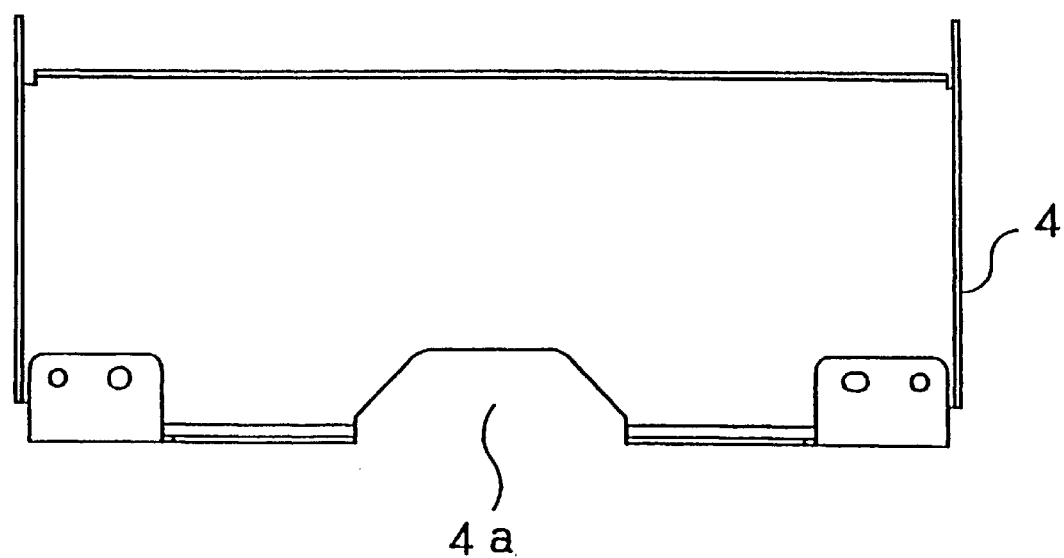
FIG. 3(b) is a plan viewed from YY line of FIG. 2 and depicting a top plate of the cassette loading mechanism.

As shown in FIGS. 1 and 2, the cassette holder 2 comprises a hook 2a for locking the loaded cassette 1 beneath the lower face and at its center of the holder 2, and a pair of hooks 2c, molded in a fish hook shape, disposed at left and right front portions beneath the lower face of the holder. A pair of link arms 3 shaped in substantially an "X" letter support both the side faces of the holder 2 so that the holder 2 can move up and down arbitrarily, and the cassette 1 inserted can be kept inside the holder 2. The up-springs 8 anchored between the holder 2 and the link arms 3 force the holder 2 upward (along the arrow mark A). The top plate 4 couples the side faces of the holder 2 around above the inserted cassette. As shown in FIGS. 3(a) and 3(b), notches 2b and 4a are provided at the cassette entrance on the holder 2 and the top plate 4 respectively for users to pinch the cassette with their fingers when the users try to load/unload the cassette into/from the holder. The side plate 5 has guide grooves 5a on its side faces for sliding the sliding shafts A 9 that are disposed on the link arms 3, and a bottom face of the side plate 5 is fixed to the chassis frame 6. The front ends of the side faces are coupled by the back plate 7 around the rear face of the cassette 1 at a loaded position where the holder 2 has been pressed down.

The mis-insertion-proof panel 11 is provided rotatively on the back plate 7 via the bearing panel 13 and a first edge of the panel 11 supported by the rotating shaft 14. The engaging shafts 12 are disposed right and left on a second edge opposite to the rotating shaft 14. The engaging shafts 12 (engaging means) are engaged with the pair of hooks 2c disposed beneath the lower face of the cassette holder 2 by the rotation of the panel 11. The restoring spring 15 (spring member) such as a coiled spring that always forces the mis-insertion-proof panel 11 to rotate toward the cassette holder 2 is disposed on the rotation supporting shaft 14.

Figure 4:
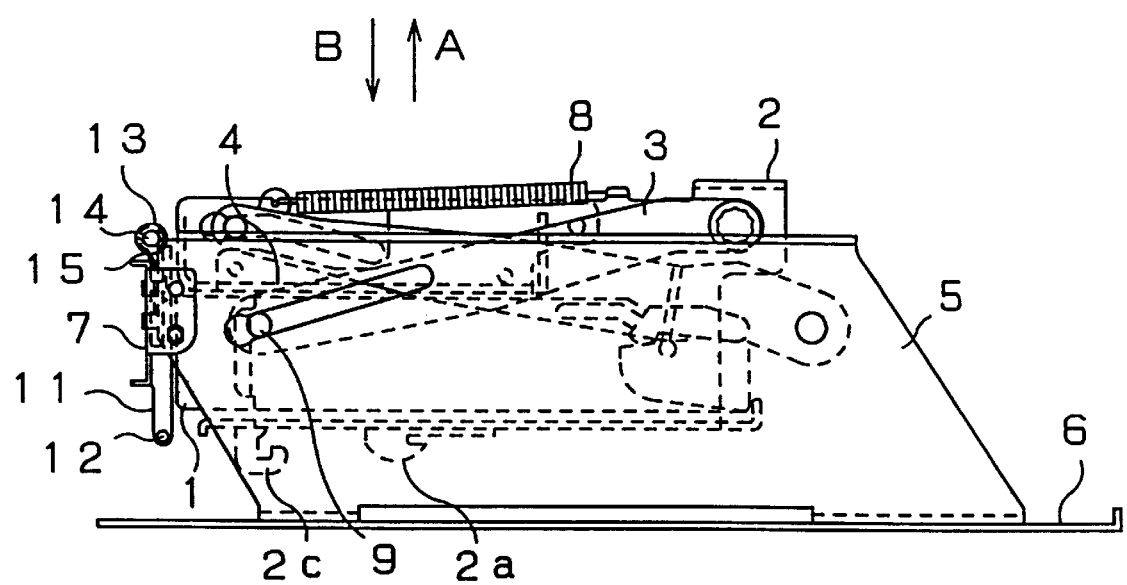
FIG. 4 is a side view depicting the structure of the cassette loading mechanism used in the embodiment of the present invention when the cassette holder thereof is at the lower end position.
Figure 5:
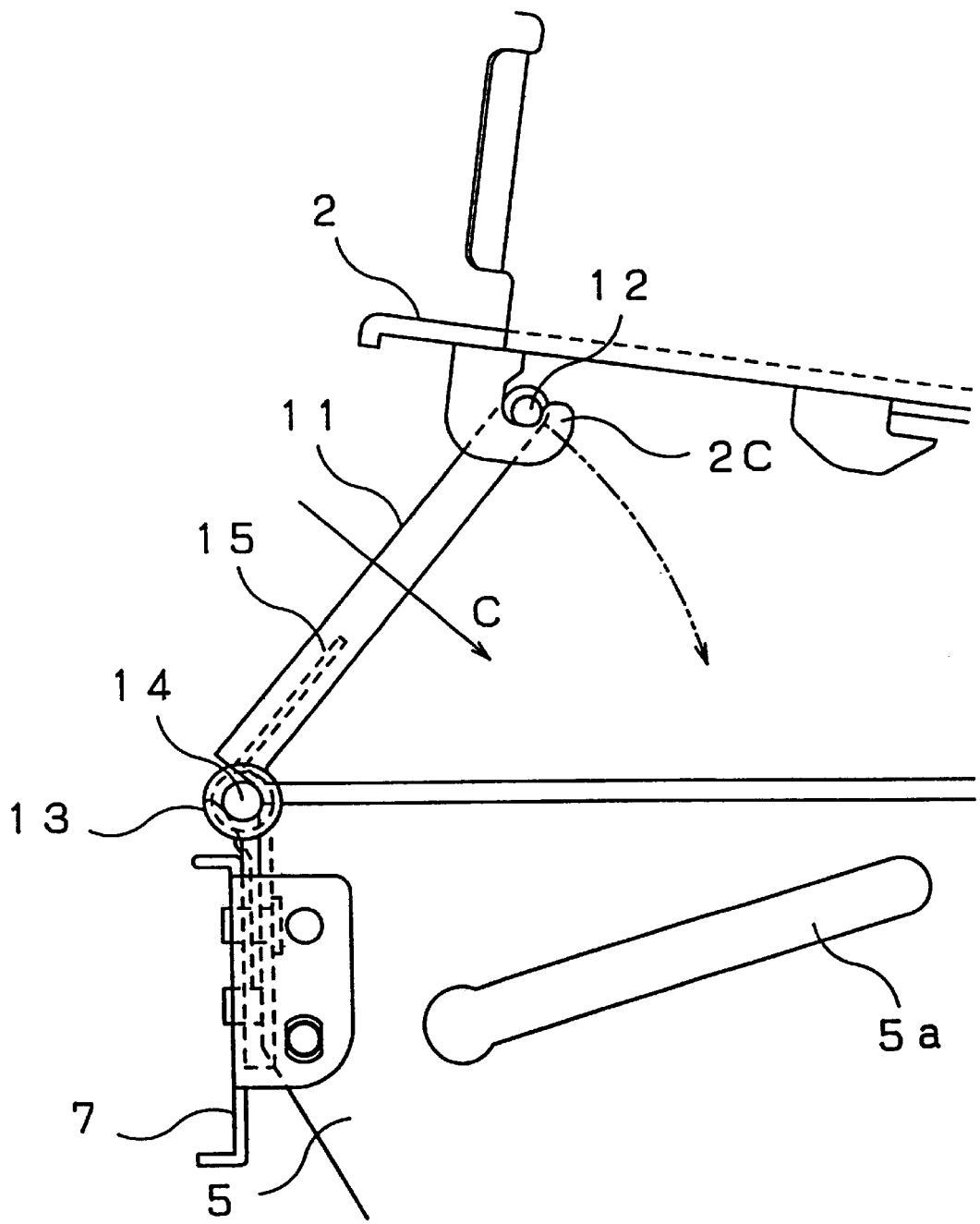
FIG. 5 is an enlarged side view depicting an engagement positioning relation between a hook disposed beneath the lower face of the cassette holder and an engaging shaft disposed at one edge of the mis-insertion-proof panel which is situated on the back plate.

An operation when the cassette is loaded is described here:

First, insert the cassette 1 into the holder 2 situated in the upper end position as shown in FIG. 1. Second, depress the holder 2 downward from the top plate 4 (along the arrow direction B), thereby the sliding shafts A 9 and B 10 disposed on the link arms 3 slide along the guide grooves 5a on the side plates 5 and the guide grooves 2b on the side faces of the holder 2 respectively. As a result, the cassette holder 2 containing the cassette 1 moves down toward the chassis frame 6. At this time, the mis-insertion-proof panel 11 is released from the engagement between the engaging shafts 12 and the fish hooks 2c due to a downward movement (along the arrow direction B) of the fish hooks 2c disposed beneath the lower face of the holder 2. Then the panel 11 starts rotating against upward force from the restoring spring 15 by sliding the engaging shafts 12 along the lower face of the holder 2. When the lower face of the holder 2 moves lower than the rotation supporting shaft 14 and approaches to the chassis frame 6, the mis-insertion-proof panel 11 continues rotating by keeping contact with a front part of the holder 2. After that, as shown in FIG. 4, the mis-insertion-proof panel 11 swings into a space between the back plate 7 and the neighborhood of rear side of the loaded cassette 1. Then locking hook 2a is engaged with a sliding lock shaft (not shown) on the chassis frame 6 side, whereby the cassette holder 2 is locked and the cassette 1 is completely loaded.

When the cassette 1 is taken out, slide the sliding lock shaft (not shown) on the chassis frame 6 side, thereby releasing the engagement with the locking hook 2a. The cassette holder 2 is then lifted upward (along the arrow direction A) by the force of the up-springs 8. The sliding shafts A 9 disposed on the link arms 3 thus hit the other ends of guide grooves 5a provided on the side plates 5, whereby the holder 2 is fixed at the upper end position (refer to FIGS. 1 and 2.) The cassette 1 is then ready to be taken out from the holder 2. In this operation, through the reverse process of loading the cassette 1, the mis-insertion-proof panel 11 rotates on the rotation supporting shaft 14 by following an upward movement of the holder 2 due to the force by the restoring spring 15. From a position where the lower face of the holder 2 reaches higher than the rotation supporting shaft 14 (toward the top plate 4), the mis-insertion-proof panel 11 moves by sliding the engaging shafts 12 along the lower face of the holder 2 until the shaft 12 are engaged with the hooks 2c disposed beneath the lower face of the holder 2, the holder 2 is thus situated completely at the upper end position. Because the hook 2c is shaped into a "J" letter (a hook terminal receiving the shaft 12 has a boss standing at a right angle with a locus of the shaft 12, which shapes the hook 2c into a "J" letter), the panel 11 is locked and will not rotate even if the panel 11 is pushed from outside (along the arrow direction C), such as by the cassette 1. This structure assures the cassette 1 of being prevented from the mis-insertion into the mechanism.

In the above embodiment, the shafts 12 disposed at the edge of the mis-insertion-proof panel 11 are engaged with the fish hooks 2c when the cassette holder 2 is at the upper end position. However, a structure without the shafts 12 and the fish hooks 2c can also always block the clearance between the cassette holder 2 and the back plate 7, i.e., the edge of the panel 11 just presses the lower face of the holder 2 so that the clearance is blocked. The cassette 1 is thus prevented from being inserted into the clearance by mistake.

The fish hooks 2c beneath the lower face of the holder can be one peace, and the mis-insertion-proof panel 11 can be directly attached to the back plate 7 with a shaft.

Industrial Applicability

A mis-insertion-proof and rotatable panel is disposed between a front part of a cassette holder and a back plate, whereby a clearance therebetween is blocked. Since the cassette holder is movable up and down on demand, an up-distance from the back plate, which allows users to take out the cassette by pinching the cassette with fingers, can be ensured. This structure thus enables users to insert/take out a cassette into/from the holder with ease, and also prevents the users from inserting the cassette by mistake into the mechanism through the clearance.

A hook is provided beneath the lower face of the cassette holder, and an engaging shaft (engaging means) is disposed on an edge of the mis-insertion-proof panel. The shaft is engaged and locked with the hook when the panel is rotated, and whereby the panel will not rotate even it is pushed from outside. This structure assures the cassette of being prevented from inserting by mistake into the clearance.

When the cassette holder moves downward for completing of the cassette load, the hook releases the shaft, and when the cassette holder reaches to the lower end position, the mis-insertion-proof panel is rotated and stored in the space between the holder and the back plate. Therefore, the panel does not bother the up and down movement of the holder, and this structure allows the mechanism to be handy and foolproof of cassette loading.

| List of marks in the drawings |
| --- |
| 1. cassette |
| 2. cassette holder |
| 2a. locking hook |
| 2b guide groove |
| 2c fish hook |
| 2d notch |
| 3. link arm |
| 4. top plate |
| 4a notch |
| 5 side plate |
| 5a guide groove |
| 6. chassis frame |
| 7. back plate |
| 8. up-spring |
| 9. sliding shaft A |
| 10. sliding shaft B |
| 11. mis-insertion-proof panel |
| 12. engaging shaft |
| 13. bearing plate |
| 14. rotation supporting shaft |
| 15. restoring spring |

What is claimed is:

1. A cassette loading mechanism comprising:

(a) a cassette holder for receiving and maintaining a cassette on demand;

(b) a side plate for supporting said holder so that the holder can move up and down arbitrary;

(c) a back plate for coupling both sides of said side plate at a neighborhood of a rear face of the cassette loaded in the holder situated at a lower end position, wherein said back plate comprises a mis-insertion-proof panel supported rotatably and substantially in a horizontal direction by a shaft, and said mis-insertion-proof panel is attached to the holder with a spring that always forces said panel to rotate, said panel rotates by following an up-and-down movement of the holder, and said panel always pushes a lower face of the holder when the holder is at an upper end position; said cassette loading mechanism further comprising a hook for engaging provided beneath a lower face of said cassette holder; and engaging means for engaging said hook, disposed on an edge of said mis-insertion-proof panel; wherein said hook is engaged with said engaging means so that said mis-insertion-proof panel does not rotate even said panel is pushed from outside when said holder is at an upper end position.

2. The cassette loading mechanism as defined in claim 1, wherein said cassette holder is moved downward from the upper end position, which also lowers the hook, whereby the engagement between said hook and said engaging means is released, and the mis-insertion-proof panel can be thus rotatably.

* * * * *